United States Patent
Breiter et al.

(10) Patent No.: US 8,631,062 B2
(45) Date of Patent: Jan. 14, 2014

(54) MANAGING DISTRIBUTED RESOURCES IN A COMPUTER SYSTEM

(75) Inventors: Gerd Breiter, Wildberg (DE); Jochen Breh, Stuttgard (DE); Thomas Spatzier, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 10/583,595

(22) PCT Filed: Dec. 9, 2004

(86) PCT No.: PCT/EP2004/053368
§ 371 (c)(1),
(2), (4) Date: May 31, 2007

(87) PCT Pub. No.: WO2005/059749
PCT Pub. Date: Jun. 30, 2005

(65) Prior Publication Data
US 2007/0245357 A1 Oct. 18, 2007

(30) Foreign Application Priority Data
Dec. 18, 2003 (EP) .................................. 03104800

(51) Int. Cl.
*G06F 15/16* (2006.01)
*G06F 15/173* (2006.01)

(52) U.S. Cl.
USPC ............ 709/201; 709/202; 709/203; 709/224

(58) Field of Classification Search
USPC .................................. 709/201, 202, 223, 224
See application file for complete search history.

(56) References Cited

U.S. PATENT DOCUMENTS

| 5,870,545 A | 2/1999 | Davis et al. |
| 5,963,914 A * | 10/1999 | Skinner et al. .................. 705/11 |
| 6,052,722 A * | 4/2000 | Taghadoss .................... 709/223 |
| 6,272,537 B1 * | 8/2001 | Kekic et al. .................... 709/223 |
| 6,336,139 B1 * | 1/2002 | Feridun et al. ................ 709/224 |
| 6,690,778 B2 | 2/2004 | Kahn |
| 6,690,788 B1 * | 2/2004 | Bauer et al. .................... 379/242 |

(Continued)

FOREIGN PATENT DOCUMENTS

WO WO9917194 4/1999

OTHER PUBLICATIONS

Grace: Building Next Generation Event Correlation Services G. Jakobson, M. Weissman, L. Brenner, C. Lafond, C. Matheus GTE Laboratories Incorporated 40 Sylvan Road Waltham, MA 02451 USA 2000.

Patent Cooperation Treaty International Search Report PCT / EP2004 / 053368 Filing Date Sep. 12, 2004 European Patent Office.

(Continued)

*Primary Examiner* — Umar Cheema
(74) *Attorney, Agent, or Firm* — Cantor Colburn LLP; John Campbell (57) ABSTRACT

The present invention provides a new management system and a new method for managing distributed resources (61-66), comprising a workflow engine (88) that can execute management workflows in order to actively control the distributed resources (61-66).

The new management system is characterized in that autonomic Correlation Services (74-76) are introduced that manage different functional parts of the managed system in cooperation with workflow engine (88), whereby each Correlation Service (74-76) employs a Correlation Engine (174,175) and a set of rules (184,185,186) that describe how underlying resources (61-66) shall be managed, whereby a controller (44) communicates with the Correlation Services (74-76).

12 Claims, 4 Drawing Sheets

(56) References Cited

U.S. PATENT DOCUMENTS

| | | | |
|---|---|---|---|
| 7,581,011 B2 * | 8/2009 | Teng | 709/229 |
| 2002/0152254 A1 * | 10/2002 | Teng | 709/100 |
| 2003/0046541 A1 * | 3/2003 | Gerdes et al. | 713/168 |

OTHER PUBLICATIONS

XP 000631664 HP Open View Event Correlation Services Kenneth R. Sheers Oct. 1996.

* cited by examiner

MANAGING DISTRIBUTED RESOURCES IN A COMPUTER SYSTEM

FIELD OF THE PRESENT INVENTION

The present invention relates to a management system and a method for managing distributed resources, comprising a workflow engine that can execute management workflows in order to actively control the distributed resources.

BACKGROUND OF THE PRESENT INVENTION

A resource is for example an application creating different events. An event is an undirected message that informs about a change in a system's state, i.e. a change of one or more of the system's Service Data Elements. Service Data is a set of attributes (name-value pairs) that define the system's state. One Service Data Element is a single attribute (name-value pair) out of a system's Service Data. A number of distributed resources is managed by a management system comprising a workflow engine that can execute management workflows in order to actively control distributed resources.

STATE OF THE ART

Prior art systems and methods for managing distributed applications or resources have the following layout. A huge configuration database stores the states of all the application's resources. These states are propagated to the database using protocols such as SNMP (Simple Network Management Protocol). A management application deployed on a management server exists to monitor and actively manage the distributed applications or resources. Such a management application basically consists of the following components:
- A correlation engine that monitors resource events, analyzes these events, performs problem detection and root-cause analysis and draws decisions according to rules contained in a rules base;
- a huge monolithic rules base that contains all the rules for managing the distributed resources; these rules may be divided into a base of rules for filtering low-level events received from resources (to perform problem detection) and into a base of rules for root-cause analysis and reasoning in order to draw useful management decisions;
- a workflow engine that can execute management workflows in order to actively control the underlying distributed applications or resources. Workflows can be triggered by the correlation engine as a result of executing specific rules.

When low-level events are received from managed resources, the correlation engine applies event filtering and aggregation rules in order to filter meaningful information, so called high-level events, out of the mass of received events. This process can be seen as problem detection. User-defined rules contained in the rules base describe certain specific events or patterns of events that indicate problems within the managed system. When problems are detected management rules are used to draw the right management decisions and, thus, to solve the problem. Decision making is also based on the state of the managed system; the state of all resources can be queried using the configuration database. As a result of decision making, workflows can be invoked in order to modify the managed system and to solve problems.

A disadvantage of the current management systems and method is that duplication of resource state data takes place. The state of resources is stored both in the resources themselves and in the configuration database. This can lead to inconsistencies of the data. Another disadvantage is the use of the huge monolithic rules base. It is hard to design and to maintain such huge rules bases, since each rule might have side effects on other rules and the whole set of rules has to be kept in mind when modifying single rules. A monolithic set of rules is not reusable for other systems, even though parts of the management system might be similar. Only the whole set of rules makes sense. It is hardly possible to reuse single parts of the rules set. When events are received, the whole set of rules has to be analyzed. This process is very complex and can be very time consuming.

OBJECT OF THE PRESENT INVENTION

Starting from this, an object of the present invention is to provide a management system and method for managing distributed resources comprising a workflow engine that can execute management workflows in order to actively control the distributed resources, avoiding the disadvantages of the prior art.

BRIEF SUMMARY OF THE INVENTION

The present invention provides a new management system and a new method for managing distributed resources, comprising a workflow engine that can execute management workflows in order to actively control the distributed resources.

For this solution as disclosed in the present invention, the following terms are used:

| | |
|---|---|
| Service Data | a set of attributes (name-value pairs) that define a system's state; |
| Service Data Element | a single attribute (name-value pair) out of a system's Service Data; |
| Event | an undirected message that informs about a change in a system's state, i.e. a change of one or more of the system's Service Data Elements; |
| low-level Event | a primitive event sent by a resource, usually carrying very little, primitive information (e.g. information about a change of a single Service Data Element); |
| Composite high-level Event | a higher-level event that has been detected among low-level events using filtering rules; can contain information about the change of a combination of several Service Data Elements; |
| Aggregate high-level Event/Event Pattern | a high-level event that has been detected as a result of aggregating several high-level events, e.g. aggregation of multiple reoccurrences of a special type of composite event within a certain time frame (event pattern); |
| Filtering Rules | rules that describe how high-level events can be detected from low-level events; |
| Aggregation Rules | rules that describe how high-level events shall be aggregated to form aggregate events; |
| Standard Web Service | Standard Web Services are software objects running on an application server and providing a service to a client; when a client calls a Standard Web Service, a new instance of this Web Service is instantiated; after finishing the call, the new instance is deleted; |

| Stateful Web Service | with Stateful Web Services, new instances are not deleted after finishing a call; instances of Stateful Web Services may be addressed by a client explicitly; the client has access to information about the state of a called service; a service instance's state persists between different calls issued by clients |
|---|---|

The new management system is characterized in that autonomic Correlation Services are introduced that manage different functional parts of the managed system in cooperation with the workflow engine. A managed system often consists of several different functional parts. Hence, when defining rules for managing the system it is necessary to define rules for managing those single functional parts. For example, if a distributed resource or application uses a cluster of servers, it is necessary to define rules for managing that cluster. Instead of inserting these rules into a huge monolithic set of rules for managing the overall system, autonomic Correlation Services are introduced that manage just functional part of the overall system. The autonomic Correlation Services store their relevant management data independently from each other. There is no need for a huge monolithic configuration database.

A preferred embodiment of the management system is characterized in that the Correlation Services directly communicate with the resources. Instead of using a configuration database for querying resource states, the autonomic Correlation Service can obtain information directly from its managed resources.

A further preferred embodiment of the management system is characterized in that each Correlation Service employs a Correlation Engine and a set of rules that describe how underlying resources shall be managed. The new system provides the advantage that each Correlation Service manages only its own Resources. New resources may be registered with a single Correlation Service during runtime. The Correlation Services are preferably defined by a description language, such as XML (Extensible Markup Language), and may be instantiated during runtime. Further, rules may be added or delete during runtime.

A further preferred embodiment of the management system is characterized in that rules for filtering low-level events issued by resources are deployed into an Event Service Application that is used to filter high-level events out of low-level events. The Correlation Services can subscribe with the Event Service in order to be notified when high-level events are detected. Whenever such high-level events are reported to a Correlation Service, this service analyzes its set of rules and draws decisions for managing its part of the system.

A further preferred embodiment of the management system is characterized in that a controller communicates with the Correlation Services. The controller instantiates running Correlation Services as Stateful Web Services in a Web Service container in accordance to user-defined descriptions of Correlation Services given in a description language such as XML. Further, the controller is used to registered resources with the Correlation Services in order to be managed. Handles to these resources are registered with the Event Service (in order to detect high-level events) and with the Correlation services.

A further preferred embodiment of the management system is characterized in that the controller communicates with the Event Service Application. Descriptions of high-level events contained in the descriptions of Correlation Services are deployed into the Event Service.

A further preferred embodiment of the management system is characterized in that the Correlation Services are modeled as Stateful Web Services. The state of the resources managed by a single Correlation Service can be queried by the Correlation Service itself. The autonomic Correlation Services have direct access to the resources. Events can be exchanged between different Correlation Services using a subscribe/notify mechanism. Single Correlation Services can be introspected by the other Correlation Services.

The new method for managing distributed resources firstly is characterized in that the user defines several correlation services for different functional parts of the managed system. The definition of a Correlation Service describes how a Correlation Service behaves and manages its part of the system. One such definition, which is preferably given in a description language such as XML, includes:

The types of resources managed by the Correlation Service;

a set of descriptions of high-level event the Correlation Service reacts on; the type of events depends on the type of managed resources, since each resource type issues specific low-level events;

a set of rules that describe how the resources shall be managed; these rules are triggered by detected high-level events, can include queries on resource states and can trigger the execution of management workflows;

a set of high-level events issued by the Correlation Service; the events can be issued as a result of rules, if problems cannot be solved by the Correlation Service; higher-level Correlation Services that might be able to solve the problem can subscribe for these events; thus, a hierarchical network can be created.

The sum of the descriptions of all Correlation Services for managing one distributed system makes up the Correlation Model for that distributed system.

Secondly, the new method for managing distributed resources is characterized in that the controller instantiates Correlation Services as running Stateful Web Services in accordance to user-defined descriptions of Correlation Services. The controller interprets the correlation model definition which comprises the descriptions of all Correlation Services used for managing a distributed system.

A preferred embodiment of the management method is characterized in that handles (Stateful Web Service Handles) to all of the resources (Stateful Web Services) managed by a Correlation Service, are stored within the Correlation Service. Instead of using a configuration database for querying resource states, the autonomic Correlation Service can obtain information directly from its managed resources which can be addressed using the mentioned handles.

A further preferred embodiment of the management method is characterized in that high-level events a specific Correlation Service shall react on are defined, and in that the respective Correlation Service creates subscriptions with an Event Service in order to be notified when such high-level events are detected. Several or all Correlation Services can subscribe with one Event Server that performs filtering of low-level events.

A further preferred embodiment of the management method is characterized in that higher-level Correlation Services use Web Service introspection to see, which events are issued by another Correlation Service. If a higher-level Correlation Service contains rules that react to high-level events issued by subordinate Correlation Services, the higher-level Correlation Service subscribes for these events with the lower-level Correlation Service. In the case that one Correlation Service cannot solve a problem the service can propagate the problem to higher-level Services. Thus, it is possible to establish a hierarchical network of Correlation Services for managing a distributed system. For example, a system consists of two server clusters that have functional dependencies. Each of these clusters is managed by a Correlation Service. Most of the problems within one cluster can be solved by the respective correlation Service. Some problems, however, cannot be solved, since functional dependencies of the two clusters have to be considered and the single Correlation Services do not have knowledge about the other cluster. A higher-level Correlation Service exists that has the required knowledge about the two clusters and their functional dependencies. Problems that cannot be solved by the lower-level Correlation Service are propagated to the higher-level Correlation Service. The higher-level Correlation Service decides what to do and can trigger the appropriate management workflows.

A further preferred embodiment of the management method is characterized in that the Correlation Services trigger the execution of workflows in order to actively manage their resources.

The present invention relates further to a computer program product stored in the internal memory of a digital computer, containing parts of software code to execute the above described management method.

BRIEF DESCRIPTION OF THE DRAWINGS

The above, as well as additional objectives, features and advantages of the present invention will be apparent in the following detailed written description.

The novel features of the present invention are set force in the appended claims. The invention itself, however, as well as a preferred mode of use, further objectives, and advantages thereof, will be best understood by reference to the following detailed description of an illustrative embodiment when read in conjunction with the accompanying drawings, wherein:

Figure 1:
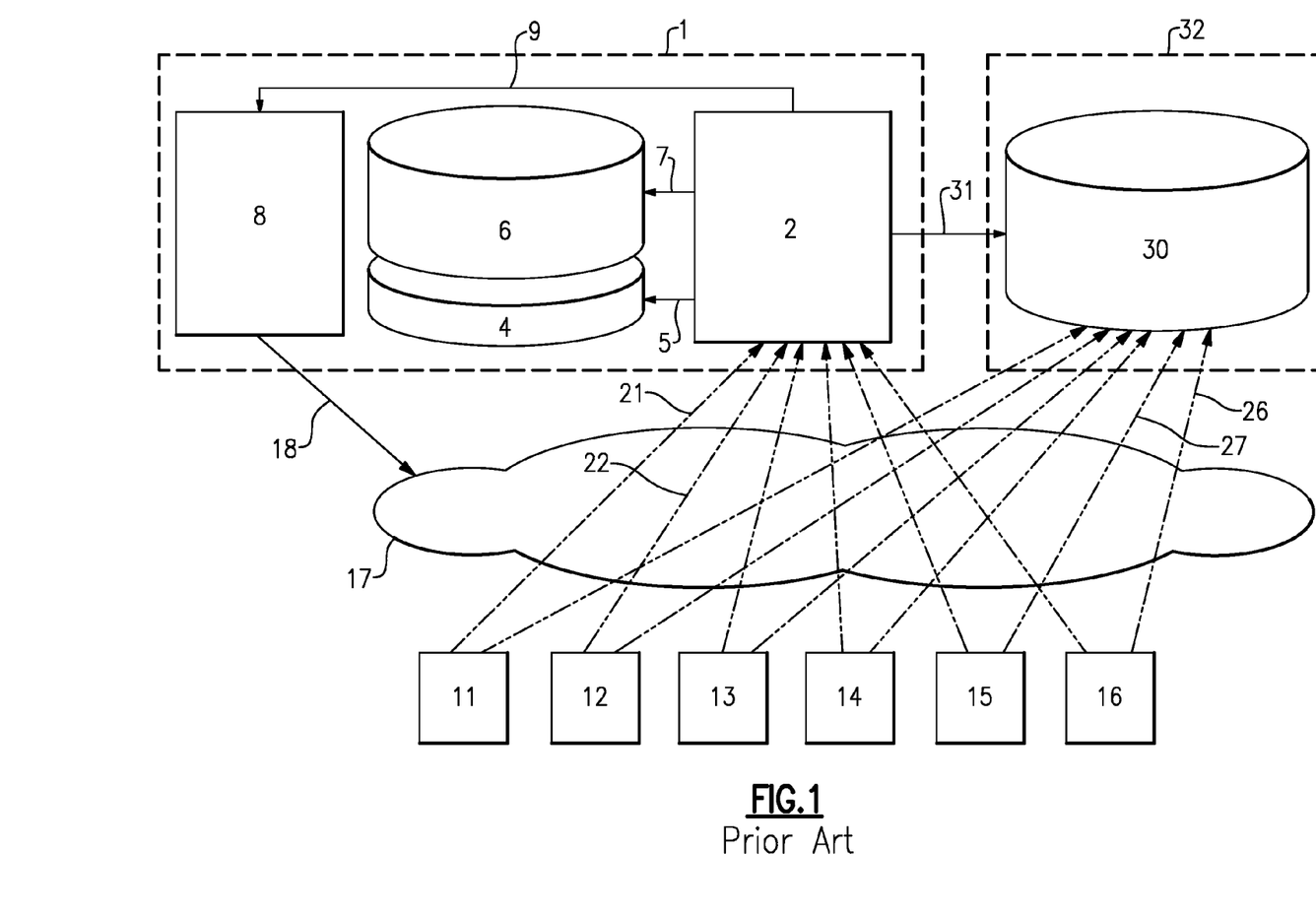
FIG. 1 shows a prior art management system.

FIG. 1 shows a prior art management system with a Management Server 1. Management Server 1 comprises a Correlation Engine 2 that cooperates with an Event Filtering and Aggregation Rules Base 4 as indicated by Arrow 5. Correlation Engine 2 further cooperates with a Management Rules Base 6 as indicated by Arrow 7. Further, Correlation Engine 2 cooperates with a Workflow Engine 8, as indicated by Arrow 9.

Workflow Engine 8 can execute Management Workflows in order to actively control distributed application or resources 11-16 over a Network 17, as indicated by Arrow 18. Arrows 21, 22 indicate that resources 11-16 communicate with Correlation Engine 2. Arrow 26, 27 indicate that resources 11-16 communicate with a Configuration Database 30. As indicated by Arrow 31, Correlation Engine 2 communicates with Configuration Database 30. Configuration Database 30 is hosted by a Database Server 32.

The prior art Management System shown in FIG. 1 operates as follows. Configuration Database 30 stores the states of all of the Application's Resources 11-16. These states are propagated to Database 30 using protocols such as SNMP (Simple Network Management Protocols) as indicated by arrows 26, 27. The management application deployed on Management Server 9 exists to monitor and actively manage the distributed applications or resources 11-16. Correlation Engine 2 monitors resource events, analyzes these events, performs problem detection and root-cause analysis and draws decisions according to rules contained in Rules Bases 4, 6. Rules Bases 4, 6 contain all the rules for managing the distributed applications or resources 11-16. The rules are divided into a base 4 of rules for filtering low-level events received from resources 11-16 and into a Base 6 of rules for root-cause analysis and reasoning in order to draw useful management decisions. Workflow Engine 8 can execute management workflows in order to actively control the underlying distributed applications or resources 11-16. Workflows can be triggered by Correlation Engine 2 as a result of executing specific rules.

When low-level events are received from managed resources 11-16, as indicated by Arrows 21, 22, Correlation Engine 2 applies event filtering and aggregation rules, as indicated by Arrow 5, in order to filter meaningful information, so called high-level events, out of the mass of received events. This process can be seen as problem detection. User-defined rules contained in the Rules Base 6 describe certain specific events or pattern of events that indicate problems within the managed system. When problems are detected management rules are used to draw the right management decisions and, thus, to solve the problem, as indicated by Arrow 7. Decision making is also based on the state of the managed system; the state of all resources 11-16 can be queried using the Configuration Database 30, as indicated by Arrow 31. As a result of decision making, workflows can be invoked, as indicated by Arrow 9, in order to modify the managed system, as indicated by Arrow 18, and to solve problems.

Figure 2:
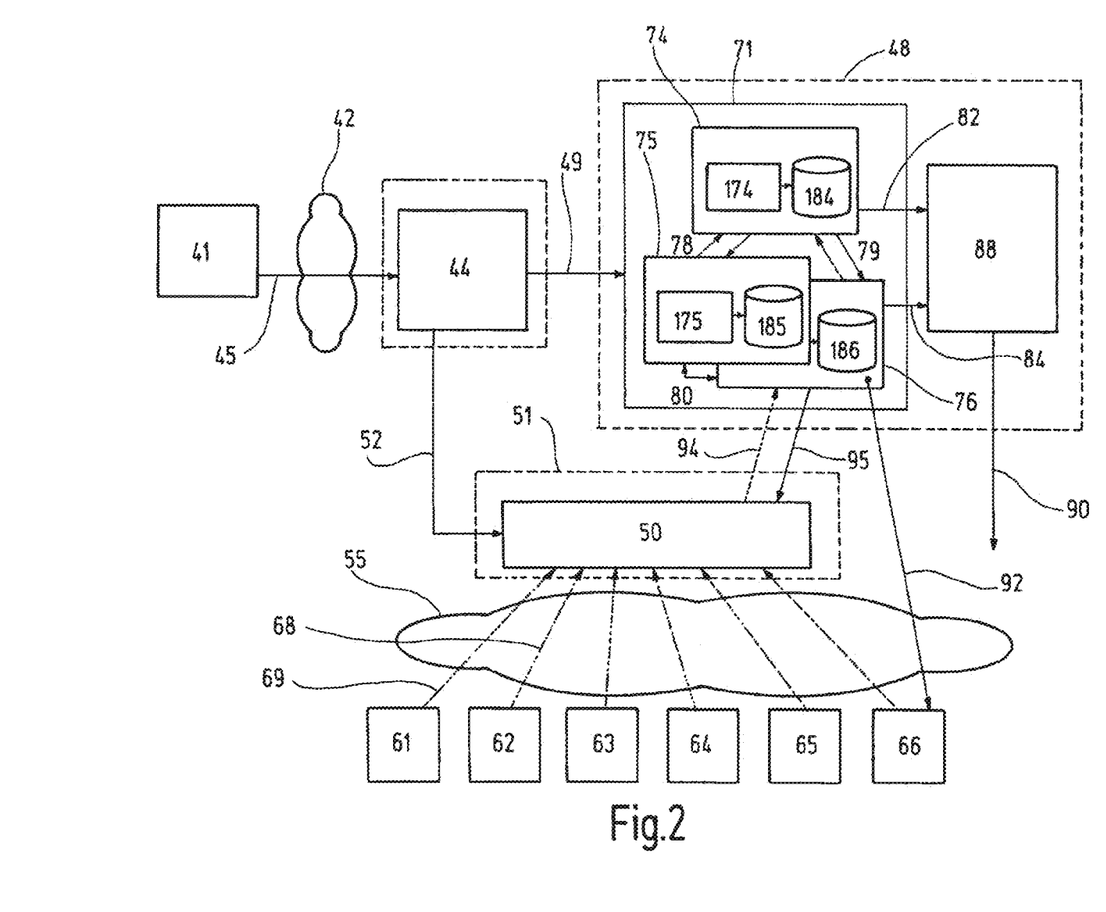
FIG. 2 shows a management system in accordance with the present invention.

FIG. 2 shows a management system in accordance with the present invention. A Management Client 41 communicates over a Network 42 with a Controller 44, as indicated by Arrow 45. Controller 44 communicates as indicated by Arrow 49, with a Correlation Server 48. Further, Controller 44 communicates, as indicated by Arrow 52, with an Event Server 51. Event Server 51 communicates over a Network 55 that can be the same as Network 42, with resources or applications 61-66, as indicated by Arrows 68, 69.

Correlation Server 48 comprises a Web Service Container 71 with Correlation Services (implemented as Stateful Web Services) 74, 75, 76. As indicated by Arrows 78, 79, 80, Correlation Services 74-76 communicate with each other. Further, Correlation Service 74 communicates, as indicated by Arrow 82, with a Workflow Engine 88. Further, Web Correlation Service 76 communicates, as indicated by Arrow 84, with Workflow Engine 88. As indicated by Arrow 90, Workflow Engine 88 executes workflows in order to actively manage resources 61-66. As indicated by Arrow 92, the state of resources 61-66 can be queried by Correlation Services 74-76. As indicated by Arrows 94, 95 Correlations Services 74-76 communicate with Event Server 51. Each Correlation Service 74-76 employs a Correlation Engine 174, 175 and a set of rules 184-186 that describe how underlying resources 61-66 shall be managed.

Figure 3:
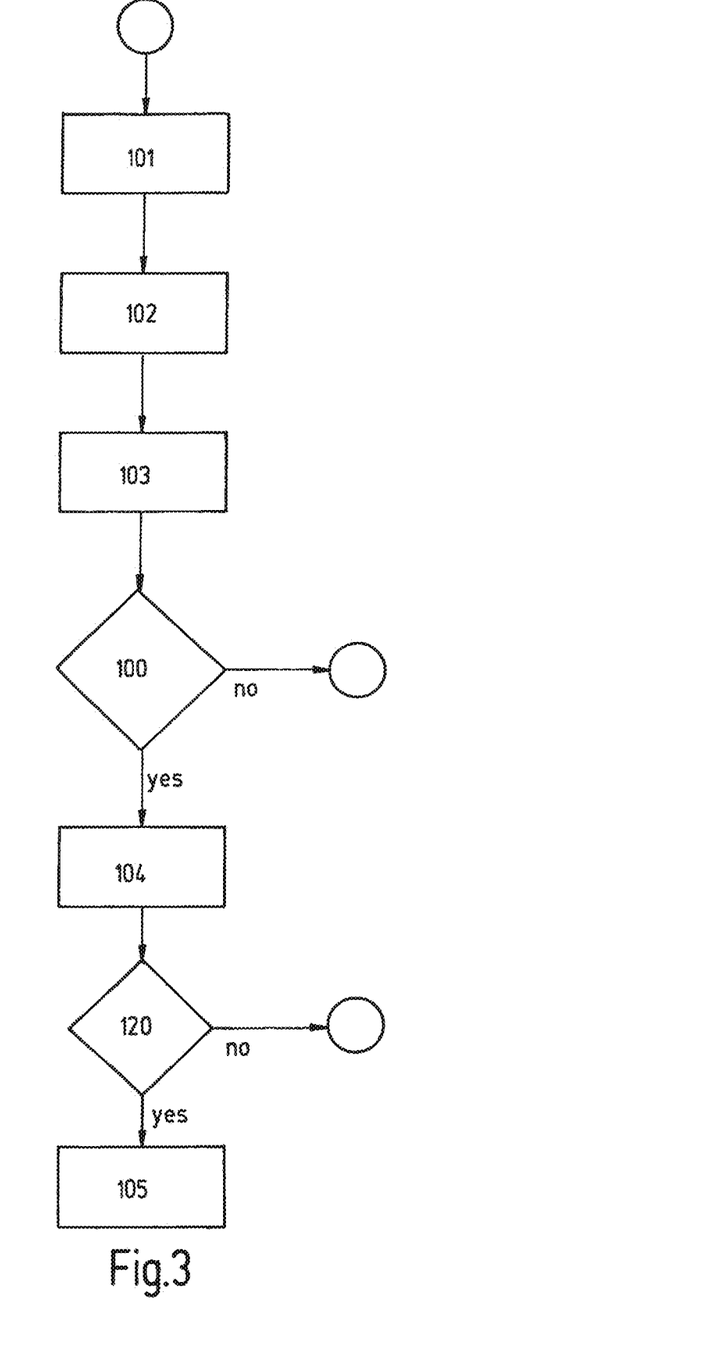
FIG. 3 shows a flow chart representing the cooperation between a management client and a Correlation Service in accordance with the present invention and FIG. 4 shows a flow chart representing the cooperation between the Correlation Server and the managed resources in accordance with the present invention.
Figure 4:
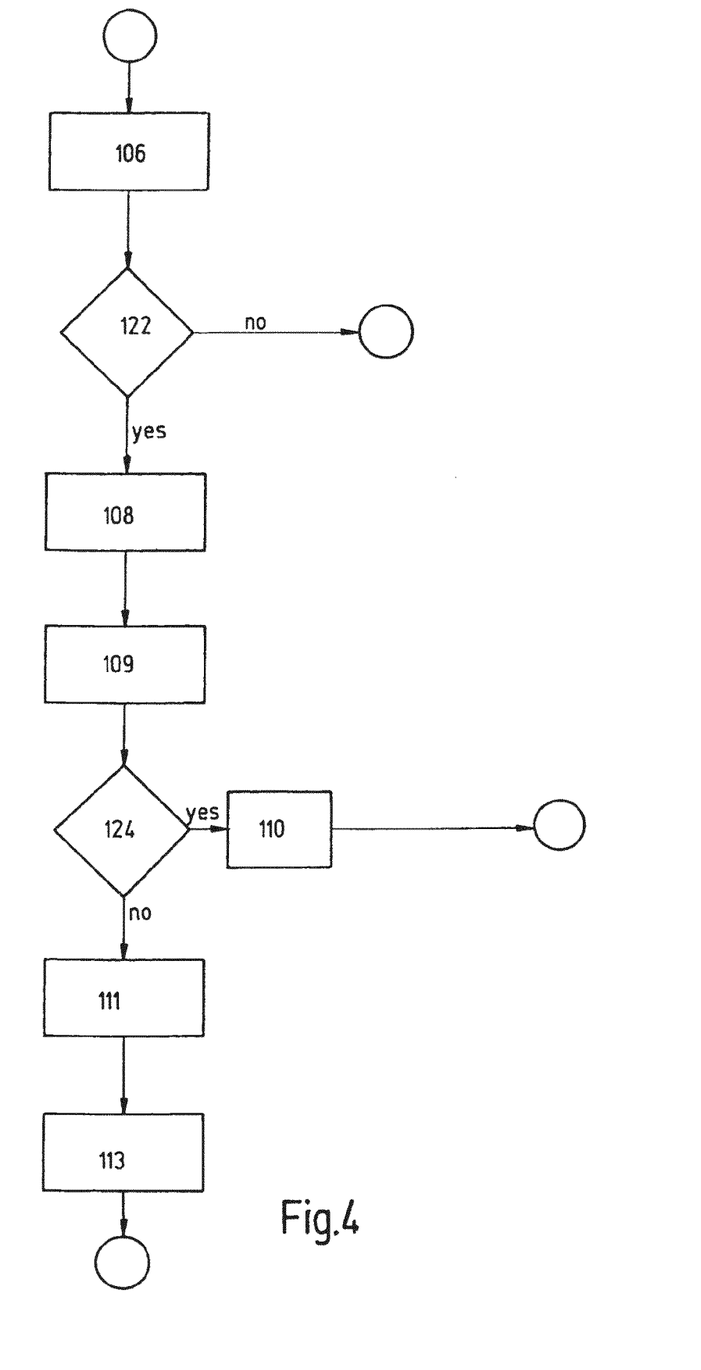

The management system shown in FIG. 2 works, as represented in flow charts 3 and 4, as follows. Management Client or User 41 defines several Correlation Services for Managing parts of a system. The definition of a Correlation Service describes how the Correlation Service behaves and manages its part of a system. Such a definition is preferably given in a description language such as XML and includes:

the types of resources managed by the Correlation Service;

a set of high-level event descriptions the Correlation service reacts on; the type of events depends on the type of managed resources, since each resource type issues specific low-level events;

a set of rules that describe how the resources shall be managed; these rules are triggered by detected high-level events, can include queries on resource states and can trigger the execution of management workflows;

a set of high-level events issued by the Correlation Service; the events can be issued as a result of rules, if Problems cannot be solved by the Correlation Service; higher-level Correlation Services can subscribe for these events to create a hierarchical network.

The flow chart shown in FIG. 3 is now explained with reference to the management system shown in FIG. 2. In step 101a user-defined Correlation Model is deployed into the correlation infrastructure by sending the correlation model definition from User 41 to Controller 44 as indicated by Arrow 45. Controller 44 interprets the Correlation Model Definition, i.e. several definitions of Correlation Services, and instantiates the running Correlation Model, i.e. several running Correlation Services, within the Correlation infrastructure. In step 102, descriptions of high-level events contained in the descriptions of Correlation Services 74-76 are deployed into Event Service 50, as indicated by Arrow 52. Event Service 50 is hosted by Event Server 51. In step 103, Controller 44 instantiates running Stateful Web services in Web Service Container 71, as indicated by Arrow 49, in accordance to the descriptions in the Correlation Model Definition. In branch 100, Correlation Services 74-76 check whether high-level events are defined a specific Correlation Service shall react on. If that is a case, in step 104, the respective Correlation Service 74-76 creates subscriptions with Event Service 50, as indicated by Arrow 95, in order to be notified, as indicated by Arrow 94, when such events are detected. In branch 120, Correlation Service 74 checks whether it contains rules that react to high-level events issued by subordinate correlation Services 75, 76, as indicated by Arrow 78, 79. If that is a case, in step 105 the higher-level Correlation Service 74 subscribes for these events with the low-level Correlation Service 75, 76. The higher-level Correlation Service 74 uses Web Service introspection to see, which events are issued by another Correlation Service 75, 76.

The flow chart of FIG. 4 is now explained with reference to the management system shown in FIG. 2. In step 106, resources 61-66 are registered with the Correlation infrastructure in order to be managed. Handles to these resources (Stateful Web Service Handles) are registered with Event Service 50, as indicated by Arrow 52, in order to detect high-level events, and with the Correlation Service 74-76, as indicated by Arrow 49. If low-level events sent by resources 61-66 are received by Event Service 50, these events are filtered in order to detect high-level events relevant for a correlation. In branch 122, it is checked whether high-level events are detected. Whenever high-level events are detected, in step 108, Correlation Services 74-76 that are subscribed for these events are notified. In step 109, Correlation Service 74-76 processes its rules in order to decide what to do. As part of decision making, the state of resources 61-66 managed by this Correlation Service can be queried. This is possible since handles to these resources have been registered in step 106. In branch 124, it is checked whether Correlation Service 74-76 can solve a problem. If that is the case, in step 110 Correlation Service 74-76 may trigger the execution of workflows, as indicated by Arrows 82, 84, in order to actively manage its resources 61-66, as indicated by Arrow 90. In the case, that one Correlation Service 75, 76 cannot solve a problem, in step 111 high-level events are propagated to a superordinate Correlation service 76 that has subscribed for these events in step 105 (see FIG. 3). In step 113, the higher-level Correlation Service 74 solves the problem, triggers workflows and affects managed resources 61-66.

The invention claimed is:

1. A management system for managing distributed resources, the system comprising:

a digital computer system including a memory storing instructions to be performed by a controller in communication with a management client, the system configured to perform a method comprising:

providing a user-defined correlation model comprising definitions of several autonomic stateful web correlation services for different functional parts of the management system to define how to manage distributed resources in the management system that have been registered with the stateful web correlation services;

instantiating, by the controller, stateful web correlation services;

executing, based on the instantiating, the stateful web correlation services in accordance with the definitions in the user defined correlation model, the executing of all the stateful web correlation services comprising monitoring and controlling a functional part of the management system in cooperation with a workflow engine, the monitoring and controlling comprising querying states of the managed resources that have been registered with the stateful web correlation services; and registering a managed resource with a selected stateful web correlation service of said stateful web correlation services, the registering enabling the selected stateful web correlation service to have access to state information of the managed resource and enabling the selected stateful web correlation service to query the state information of the managed resource; and accessing, by the selected stateful web correlation service, the state information;

wherein the stateful web correlation services are modeled as stateful web services to instantiate said correlation services according to the user-defined correlation model, all of said stateful web correlation services configured to introspect one other and subscribe to events issued by one other for managing their respective functional part of said managed system and, in said management of a functional part of the management system, a single correlation service checks whether it contains rules that react to high-level events issued by subordinate correlation services, and uses web service introspection to determine which events are issued by another correlation service.

2. The management system according to claim 1, wherein the stateful web correlation services directly communicate with the managed resources.

3. The management system according to claim 1, wherein rules for filtering low-level events issued by managed resources are deployed in an event service application configured to filter high-level events from low-level events.

4. The management system according to claim 3, wherein the controller communicates with the event service application.

5. A computer implemented method for managing distributed resources in a computer system, the method comprising:
providing a user defined correlation model comprising definitions of several autonomic stateful web correlation services for different functional parts of the managed system to define how to manage distributed resources in the managed system that have been registered with the stateful web correlation services;
instantiating, by a controller, the stateful web correlation services;
executing, based on the instantiating, the stateful web correlation services in accordance with the definitions in the user defined correlation model, the executing of all the stateful web correlation services comprising monitoring and controlling a functional part of the computer system in cooperation with a workflow engine, the monitoring and controlling comprising querying states of the managed resources that have been registered with the stateful web correlation services;
registering a managed resource with a selected stateful web correlation service of said stateful web correlation services, the registering enabling the selected stateful web correlation service to have access to state information of the managed resource and enabling the selected stateful web correlation service to query the state information of the managed resource; and
accessing, by the selected stateful web correlation service, the state information;
wherein the user defined correlation model further comprises a set of rules that describe how the managed resources shall be managed; said rules being triggered during the executing based on high-level events being detected, the rules initiating queries on resource states and triggering the execution of management workflows, wherein said correlation model defines a set of high-level events which can be issued by the correlation service as a result of said rules, and based on detected problems not being resolved by a stateful web correlation service, a higher-level stateful web correlation service can subscribe for these events to create a hierarchical network as said higher-level stateful web correlation services use web service introspection to determine which events are issued by another one of said stateful web correlation services.

6. The method according to claim 5, wherein handles to all of the resources managed by a single one of said stateful web correlation services are stored within the single one of said stateful web correlation services.

7. The method according to claim 5, wherein the definitions in the user defined correlation model further include definitions of events on which a specific single one of said stateful web correlation services shall react; and the method further comprises creating a subscription, by the respective single one of said stateful web correlation services, with an event service in order to be notified when such events are detected.

8. The method according to claim 5, wherein the monitoring and controlling further comprises triggering the execution of workflows by the workflow engine in order to actively manage the managed resources.

9. A computer program product for managing distributed resources in a computer system, the computer program product comprising:
a non-transitory tangible storage medium readable by a processing circuit and storing instructions for execution by the processing circuit for performing a method comprising:
providing a user defined correlation model comprising the definitions of several autonomic stateful web correlation services for different functional parts of the managed system to define how to manage distributed resources in the managed system that have been registered with the stateful web correlation services;
instantiating, by a controller, the stateful web correlation services; and
executing, based on the instantiating, the stateful web correlation services in accordance with the definitions in the user defined correlation model, the executing of each stateful web correlation service comprising monitoring and controlling a functional part of the computer system in cooperation with a workflow engine, the monitoring and controlling comprising querying states of the managed resources that have been registered with the stateful web correlation services;
registering a managed resource with a selected stateful web correlation service of said stateful web correlation services, the registering enabling the selected stateful web correlation service to have access to state information of the managed resource and enabling the selected stateful web correlation service to query the state information of the managed resource; and
accessing, by the selected stateful web correlation service, the state information;
wherein the user defined correlation model further comprises a set of rules that describe how the managed resources shall be managed; said rules being triggered during the executing based on high-level events being detected, the rules initiating queries on resource states and trigger the execution of management workflows, wherein said correlation model defines a set of high-level events which can be issued by the correlation service as a result of said rules; and based on detected problems not being resolved by a stateful web correlation service, a higher-level stateful web correlation services can subscribe for these events to create a hierarchical network as said higher-level stateful web correlation services use web service introspection to determine which events are issued by another one of said stateful web correlation services.

10. The computer program product of claim 9, wherein handles to all of the resources managed by a single one of said stateful web correlation services are stored within the single one of said stateful web correlation services.

11. The computer program product of claim 9, wherein definitions in the user defined correlation model further include definitions of events on which a specific single one of said stateful web correlation services shall react, and the method further comprises creating a subscription, by the respective single one of said stateful web correlation services with an event service in order to be notified when such events are detected.

12. The computer program product of claim 9, wherein the monitoring and controlling further comprises triggering the execution of workflows by the workflow engine in order to actively manage the managed resources.

* * * * *